United States Patent
Hara et al.

(10) Patent No.: US 7,853,570 B2
(45) Date of Patent: Dec. 14, 2010

(54) METHOD AND SYSTEM FOR DATA PROCESSING WITH PARALLEL DATABASE SYSTEMS

(75) Inventors: Norihiro Hara, Kawasaki (JP); Tetsuya Suzuki, Yokohama (JP); Ryuichi Hoshino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/415,240

(22) Filed: May 2, 2006

(65) Prior Publication Data

US 2007/0016589 A1    Jan. 18, 2007

(30) Foreign Application Priority Data

Jul. 12, 2005   (JP)   ............... 2005-203138

(51) Int. Cl.
*G06F 7/00*   (2006.01)
*G06F 17/00*   (2006.01)

(52) U.S. Cl. ................ 707/674; 707/675; 707/676; 707/677; 707/678; 707/679; 707/680; 707/681; 707/682; 707/683; 707/684; 707/685; 707/686; 707/687

(58) Field of Classification Search ............... None
See application file for complete search history.

(56) References Cited

U.S. PATENT DOCUMENTS

| | | | | |
|---|---|---|---|---|
| 4,769,772 A | * | 9/1988 | Dwyer | 707/2 |
| 5,247,664 A | * | 9/1993 | Thompson et al. | 707/10 |
| 5,675,791 A | * | 10/1997 | Bhide et al. | 707/205 |
| 6,079,000 A | * | 6/2000 | Cooper et al. | 711/162 |
| 6,463,439 B1 | * | 10/2002 | Dahlberg | 707/100 |
| 6,516,325 B1 | * | 2/2003 | Blanchard et al. | 707/104.1 |
| 7,058,958 B1 | * | 6/2006 | Shutt et al. | 719/328 |
| 2002/0103846 A1 | * | 8/2002 | Zisapel et al. | 709/105 |
| 2003/0158865 A1 | * | 8/2003 | Renkes et al. | 707/200 |
| 2005/0187977 A1 | * | 8/2005 | Frost | 707/104.1 |
| 2009/0055444 A1 | | 2/2009 | Hara et al. | |

FOREIGN PATENT DOCUMENTS

| | | |
|---|---|---|
| JP | 2002-236601 | 8/2002 |
| JP | 2004-318744 | 11/2004 |

OTHER PUBLICATIONS

David J. Dewitt, Jim Gray, "Parallel Database Systems: The Future of High Performance Database Systems", Communications of the ACM, vol. 36, No. 6, 1992, pp. 85-92.

* cited by examiner

*Primary Examiner*—Yicun Wu
*Assistant Examiner*—Yu Zhao
(74) *Attorney, Agent, or Firm*—Antonelli, Terry, Stout & Kraus, LLP.

(57) ABSTRACT

A database processing system including a plurality of partitioned databases. Data processing is performed with pieces of information processing apparatus associated with each of the partitioned databases respectively. In response to a query, a status table indicating availability of each information processing apparatus is read from the storage. Of the pieces of information processing apparatus for processing the received query, at least a serviceable one is determined as a process request destination. A process request corresponding to the query is transmitted to the information processing apparatus determined as the process request destination. The process request is received through a communication unit, and data on the database are consequently processed. A processing result is transmitted to a transmitting source through the communication unit.

7 Claims, 6 Drawing Sheets

FIG. 4

| | |
|---|---|
| MSTUP | ~401 |
| MSTAD | ~402 |
| MSTDL | ~403 |

FIG. 5

| | | |
|---|---|---|
| BES1 | Unavailable | ~501 |
| BES2 | Unavailable | ~502 |
| BES3 | Available | ~503 |
| BES4 | Available | ~504 |

FIG. 6

| | | |
|---|---|---|
| BES1 | BES2 | ~601 |
| BES2 | BES1 | ~602 |
| BES3 | BES4 | ~603 |
| BES4 | BES2 | ~604 |
| BES4 | BES3 | ~605 |

METHOD AND SYSTEM FOR DATA PROCESSING WITH PARALLEL DATABASE SYSTEMS

INCORPORATION BY REFERENCE

The present application claims priority from Japanese application JP 2005-203138 filed on Jul. 12, 2005, the content of which is hereby incorporated by reference into this application.

BACKGROUND OF THE INVENTION

The present invention relates to a database processing technique for performing data processing with servers associated with a plurality of partitioned databases into which a database has been partitioned, and particularly relates to a technique effectively applied to a database processing technique for performing database processing with master data stored and held in each partitioned database.

In order to support a large-scale database and a high-load process request, an architecture for distributing the process load of the database to each of a plurality of processors so as to execute concurrent processing has been known. For example, such a technique has been disclosed in David J. DeWitt and Jim Gray, "Parallel Database Systems: The Future of High Performance Database Systems", COMMUNICATIONS OF THE ACM, Vol. 36, No. 6, 1992, p. 85-p. 98. In a shared everything or shared disk (share mode) architecture according to the background art, all computers executing database processes can gain access to all data. In a shared nothing (non-share mode) architecture, each computer can gain access to only data stored in disks connected to the computer itself.

The shared nothing (non-share mode) architecture is much more excellent in scalability than the share mode architecture because the shared notching architecture has fewer shared resources among constituent units executing the database processes.

SUMMARY OF THE INVENTION

However, in a parallel RDBMS (Relational Database Management System) of a shared nothing architecture in which a database is partitioned into pieces (referred to as "partitioned DBs"), and dedicated servers are assigned for accesses to the partitioned DBs respectively so that a DB access request from a user can be concurrently processed by those plural dedicated servers so as to attain both the high-speed access and the scalability, accesses are concentrated in master data to which UAPs (User Application Programs) associated to the dedicated servers respectively make reference in common. Thus, the master data serve as a bottleneck for the system as a whole. The dedicated servers herein are not limited to server machines as hardware, but may be designated as individual components constituting the database management system. Hereinafter, the dedicated servers will be referred to as "servers" simply or "back end servers (BESs)".

One of methods for avoiding the access concentration in the master data is a method in which the master data are stored and held in the partitioned DBs individually. In this method, however, there is a problem of the following possibility when the master data are frequently updated. Specifically, when there occurs a failure in a BES or a server machine where a BES is disposed, there occurs an error in an update process over the master data in the BES. As a result, updating the master data associated with the other BESs than the BES where there occurs a failure is also delayed. Thus, service for all the operations referring to the master data is substantially suspended. Because failure of one BES gives influence to the system as a whole, it is desired to reduce the influence upon the system as a whole.

In order to solve the foregoing problem, an object of the invention is to localize influence of a possible failure in one information processing apparatus so as to reduce the influence on the system as a whole.

According to the invention, there is provided a database processing system for performing data processing with pieces of information processing apparatus being associated with a plurality of partitioned databases into which a database is partitioned, wherein: at least a serviceable one of the pieces of information processing apparatus is determined as a process request destination so as to perform a process request.

In order to solve the foregoing problem, the database processing system according to the invention is configured as follows. That is, a database is partitioned into a plurality of partitioned databases, and DB access servers (BESs) serve as information processing apparatus. Data processing is performed with the BESs being associated with the partitioned databases respectively. In this event, a query from an AP (Application Program) is received by a process request receiving server (front end server: FES). It is determined whether the AP is a DB process service application or not, that is, whether the AP is processed and controlled in accordance with the serviceable status of a BES or not. When the AP is a DB process service application, a DB process service status indicating whether each BES is serviceable or not is acquired. Only BESs in service ("Available") are determined as process request destinations. A process (DB access) request corresponding to the query is transmitted to the determined BESs.

In the BESs receiving the process request, data on the database are processed in accordance with the received process request. Results of the process are transmitted to the FES as a transmission source of the process request. The FES receives the results from the BESs to which the process request was transmitted. When all the DB access results indicate normal termination, a result of the query is set as normal termination and sent back to the AP.

The service in the invention means a function to be implemented by execution of a program or an object. The FES or BES may be hardware such as a computer or the like, or a program or an object for carrying out such a process.

According to the invention, even when there occurs a failure in one information processing apparatus, the influence thereof can be localized to minimize the influence on the system as a whole.

BRIEF DESCRIPTION OF THE DRAWINGS

FIG. 4 is a diagram showing an example of a DB process service application AP table 400;

FIG. 5 is a diagram showing an example of a DB process service status table 500;

FIG. 6 is a diagram showing an example of a DB process service related table 600;

DESCRIPTION OF THE EMBODIMENTS

Description will be made below about a database processing system according to an embodiment for performing data processing with BESs associated with a plurality of partitioned databases into which a database is partitioned.

Figure 1:
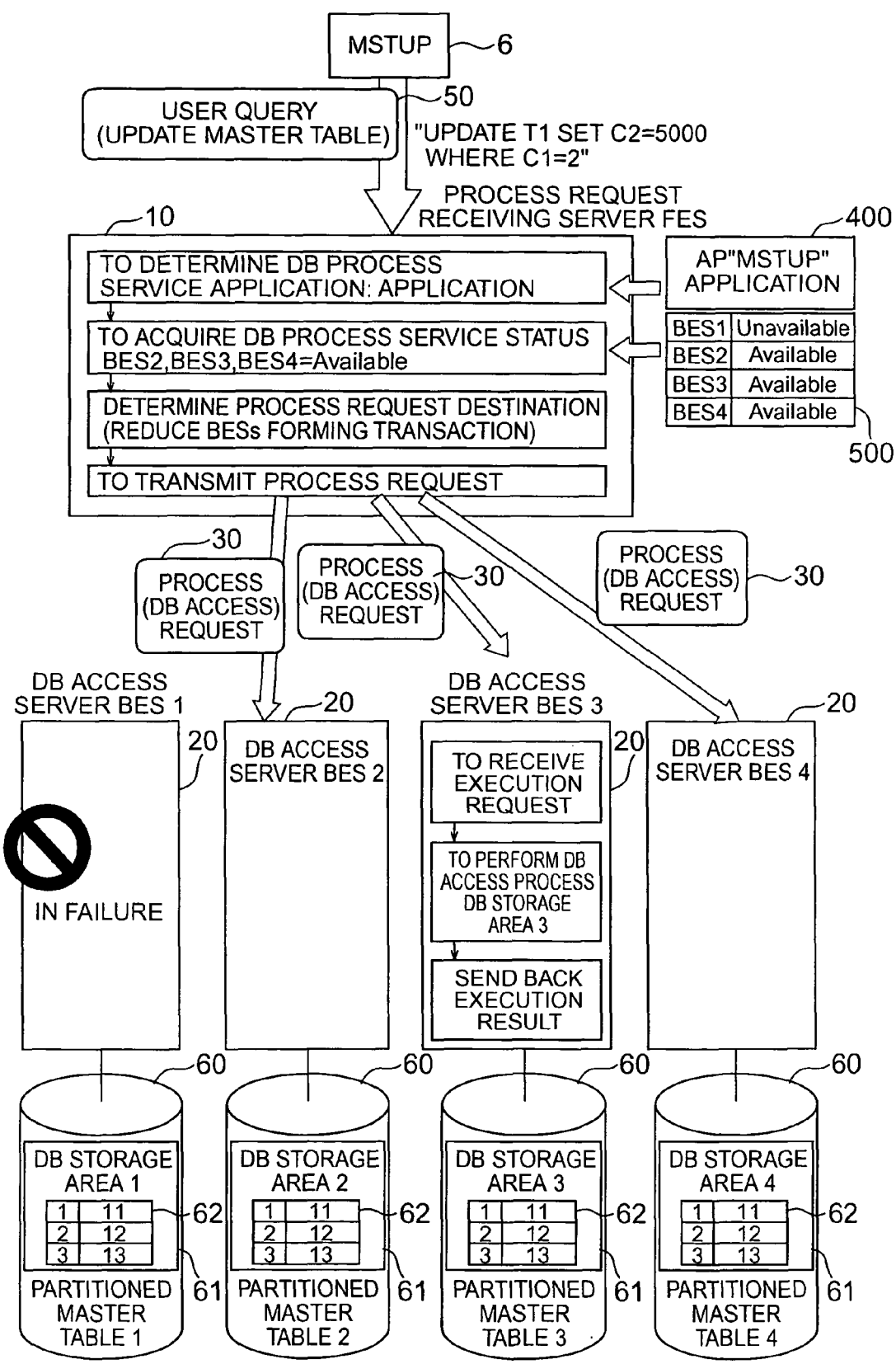
FIG. 1 is a diagram showing the concept of a database processing system.

FIG. 1 is a diagram showing the concept of the database processing system according to this embodiment. The database processing system according to the embodiment has a process request receiving server (FES) 10 (FES: Front End Server) and DB access servers (BES) 20 (BES: Back End Server) as components of a database management system described previously.

The process request receiving server (FES) 10 receives a user query 50 from a user application program 6 (designated as MSTUP), analyzes the user query 50, generates a DB access request and transmits the DB access request to a DB access server. The process request receiving server (FES) 10 sends a result of DB access back to the user application program 6 in accordance with necessity. The DB access server (BES) 20 receiving the DB access request from the process request receiving server (FES) 10 processes data on a DB storage area in accordance with necessity, and sends a result back to the process request receiving server (FES) 10 in accordance with necessity. Each of the process request receiving server (FES) 10 and the DB access server (BES) 20 is implemented by one process or a plurality of processes.

The architecture of the database management system according to the embodiment is a shared nothing (non-shared mode) architecture, in which a database (e.g. a table and an index) managed by this system is partitioned into a plurality of partitioned tables and a plurality of partitioned indexes in various manners, and distributed to and stored in a plurality of DB storage areas. Each DB storage area is associated with a fixed one of the DB access servers, and the DB access server gains access to only data (e.g. table data and index data) in the DB storage area associated with the DB access server.

Normally in the example of FIG. 1, the BES1 processes only access requests to the DB storage area 1, and the BES 2 processes only access requests to the DB storage area 2. There is no case that the BES 1 and the BES 2 gain access to one and the same DB storage area.

In the example of FIG. 1, a "master table" the UAP will refer to as shared data is partitioned into a plurality of partitioned tables 62 (a partitioned master table 1, a partitioned master table 2, a partitioned master table 3 and a partitioned master table 4). The master data are stored in each partitioned master table, and referred to by the UAP gaining access to the database via each DB access server (BES) 20 (BES 1, BES 2, BES 3, BES 4). That is, the UAP gaining access to the BES 1 always refers to the master data of the partitioned master table 1; the UAP gaining access to the BES 2 always refers to the master data of the partitioned master table 2; the UAP gaining access to the BES 3 always refers to the master data of the partitioned master table 3; and the UAP gaining access to the BES 4 always refers to the master data of the partitioned master table 4. The master data stored in the partitioned master tables are updated to latest values timely by another user application program 6 (MSTUP). A user query 50 to update the master data is, for example, implemented by the following SQL sentence:

UPDATE T1 SET C2=5000 WHERE C1=2

Normally, the user query 50 is accepted by the process request receiving server (FES) 10 so as to serve as a process (DB access) request 30, whose control is made by the DB access servers (BESs) 20 (BES 1, BES 2, BES 3 and BES 4) associated with all the partitioned master tables storing the master data. Each DB access server (BES) 20 receiving the DB access request 30 updates the master data stored in its associated partitioned master table (DB access process). The DB access server (BES) 20 then sends an execution result to the process request receiving server (FES) 10. The process request receiving server (FES) 10 receives the execution results from the BESs respectively. When all the execution results from the BESs are normal, the process request receiving server (FES) 10 sets a result of the query from the UAP as normal and sends the result back to the UAP.

Here, assume that the DB access server BES 1 is under suspension for some reason (such as a hardware failure of the machine or the like). In that case, first, the process request receiving server (FES) 10 receiving the user query 50 to update the master data refers to a DB process service application AP table 400 so as to determine whether the UAP as a request source of the user query 50 is "DB process service applicable" or not. The "DB process service applicable" indicates that process control can be performed while being logically conscious of whether the service of the DB access server suspended due to a failure of the DB access server or the like is under suspension or not. Here, "MSTUP" which is the request source UAP is "DB process service applicable". In that case, the DB process service status is acquired with reference to a DB process service status table 500 in the next step. Here, the BES 1 is in failure and "Unavailable". The BES 2, the BES 3 and the BES 4 are active and "Available". The DB process service status table 500 managing "Unavailable"/"Available" is typically disposed on a memory the FES can gain access to. The DB process service status table 500 is updated automatically when there occurs a failure in any BES. Alternatively, a database manager or the like may update the DB process service status table 500 through a utility, a command, or the like, provided by the DBMS (Database Management System).

When there is no "Unavailable" BES, a process (DB access) request is transmitted to each of the BESs 1 to 4. Here, when there is an "Unavailable" BES, information indicating that status is acquired in advance, and only "Available" BESs are decided as process request destinations. That is, BESs forming a transaction of an update process are changed (reduced in this embodiment). In this example, the BES 2, the BES 3 and the BES 4 are decided as BESs forming a transaction. The process request is transmitted to the BESs decided as BESs forming an update process in advance. When the results from the BESs are all normal, the update result is set as normal and sent back to the request source UAP 6. That is, in this example, the BES 1 is removed from components forming a transaction. As a result, even if the BES 1 is in failure, the process for updating the master data can be executed by the BES 2, the BES 3, and the BES 4 without delay so that the BES 2, the BES 3 and the BES 4 can avoid receiving the influence of the failure of the BES 1. That is, the influence given to the system by the failure of the BES 1 can be suppressed to a minimum.

Figure 2:
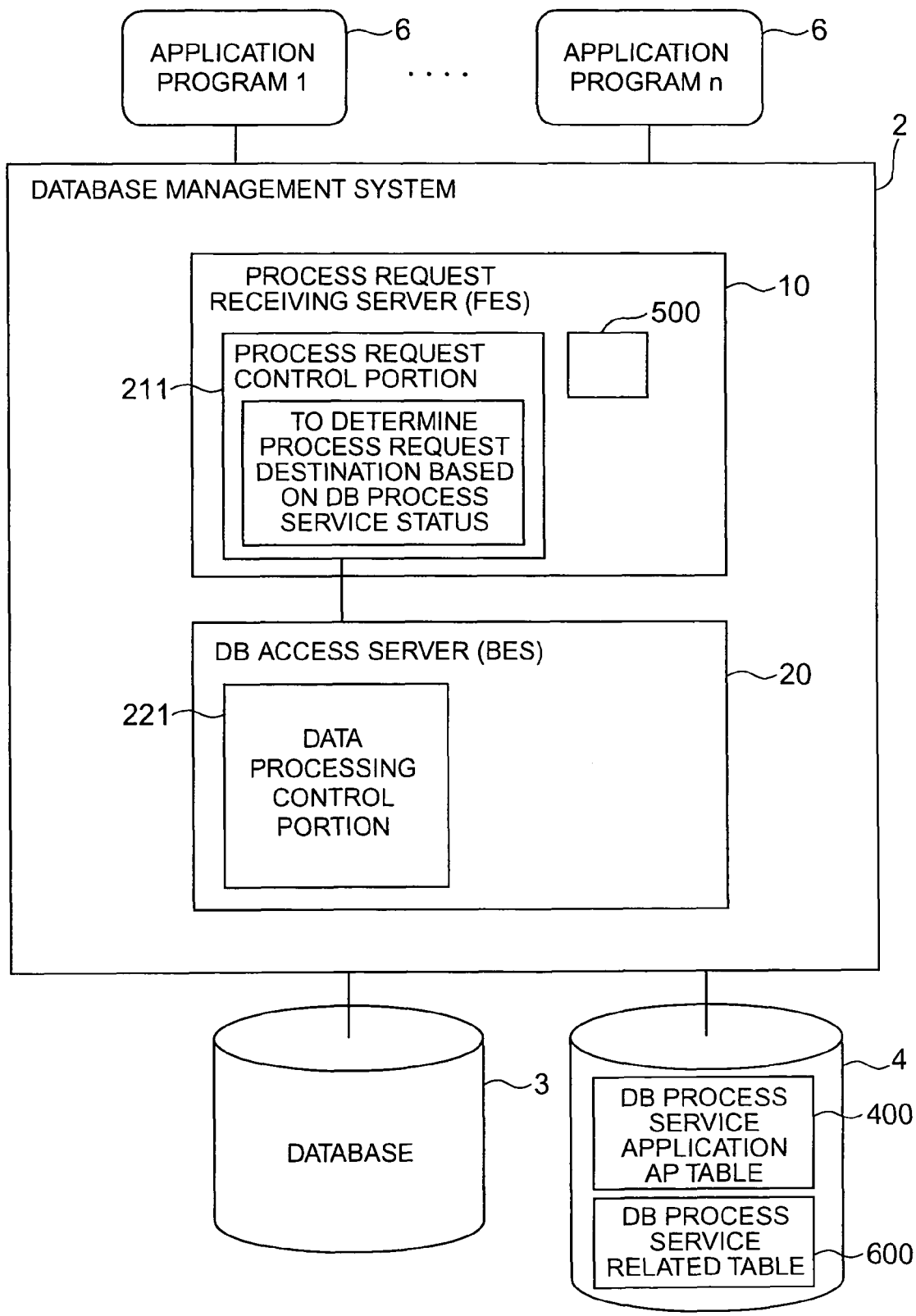
FIG. 2 is a diagram showing the schematic configuration of the database processing system.

FIG. 2 is a diagram showing the schematic configuration of the database processing system according to the embodiment. As shown in FIG. 2, the database processing system according to the embodiment includes application programs 6 produced by users, and a database management system 2 for managing the database system as a whole, including queries, resources, etc.

The database management system 2 has a process request receiving server (FES) 10 and a DB access server (BES) 20. The database management system 2 also includes a database 3 for permanently or temporarily storing data to be accessed, a DB process service application AP table 400 and a DB process service related table 600.

The process request receiving server (FES) 10 accepts and analyzes a query put from each application program 6, generates a DB access request and transmits the DB access request to the DB access server (BES) 20. The process request receiving server (FES) 10 sends a result of DB access back to the application program 6 in accordance with necessity. The DB access server (BES) 20 receives the DB access request from the process request receiving server (FES) 10, and gains access to the database 3 stored on an external storage unit in accordance with the request.

The database management system 2 is connected to other systems through a network or the like. The process request receiving server (FES) 10 and the DB access server (BES) 20 do not have to be disposed on one and the same information processing apparatus. The process request receiving server (FES) 10 and the DB access server (BES) 20 may be disposed on different pieces of information processing apparatus if they serve as a single database management system via a network or the like. When a plurality of FESs are disposed in one database management system, the load of requests from a large number of users can be distributed to the FESs. When a plurality of BESs are provided, parallelism of data processing can be enhanced to achieve high-speed data processing over a large-scale database.

The process request receiving server (FES) 10 has a process request control portion 211 for performing syntactic analysis and semantic analysis on a query, determining a proper procedure, generating codes corresponding to the procedure, and giving a DB access request to the DB access server (BES) 20. The process request control portion 211 of the process request receiving server (FES) 10 determines the statuses of DB process services in DB access servers of request destinations so as to select a process request destination in accordance with the statuses before giving the DB access request.

The DB access server (BES) 20 has a data processing control portion 221 for performing access control or the like over the data on the database 3 in accordance with the DB access request (generated codes) received from the process request receiving server (FES) 10.

Figure 3:
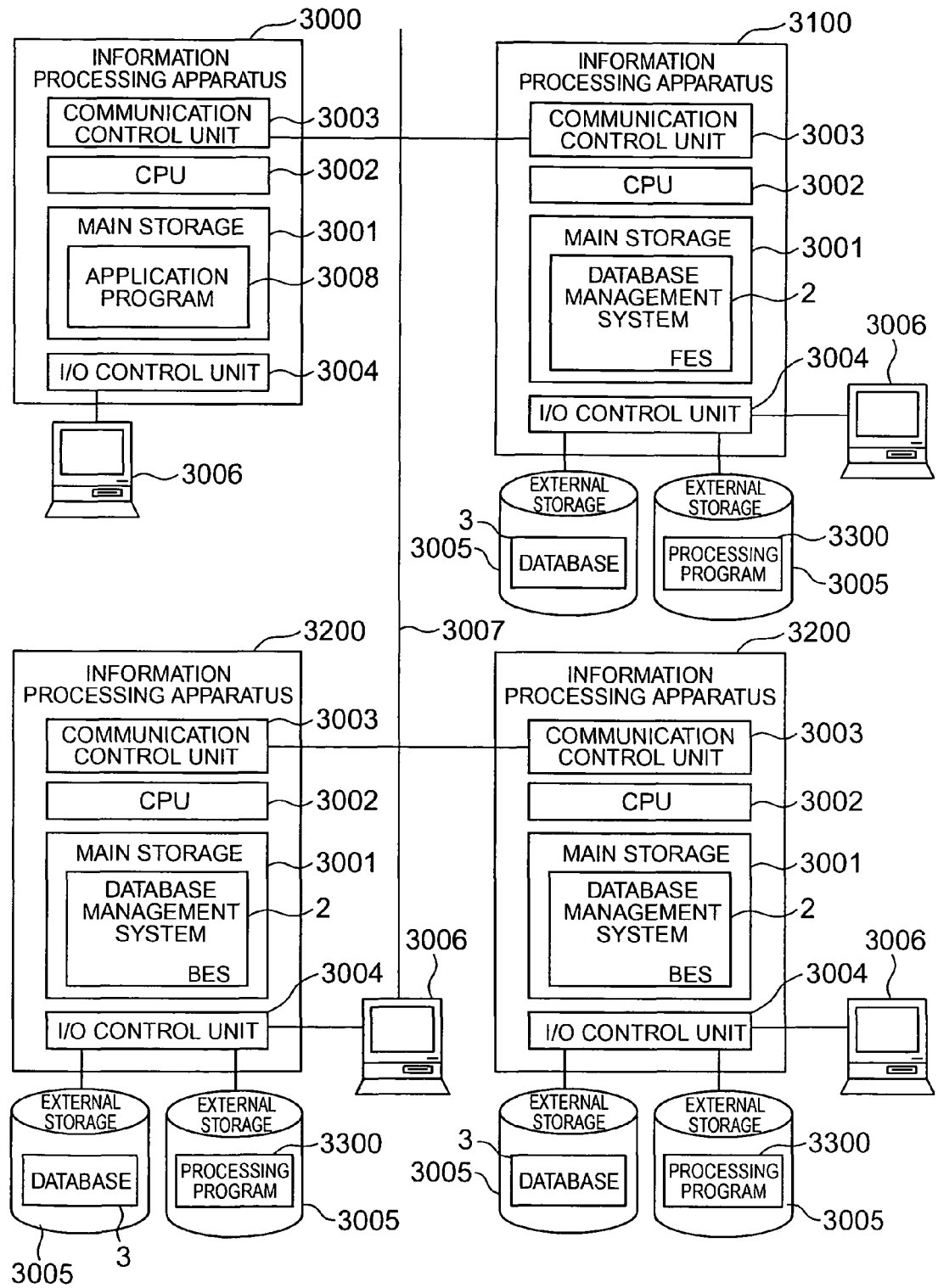
FIG. 3 is a diagram showing an example of the hardware configuration of a computer system.

FIG. 3 is a diagram showing an example of the hardware configuration of a computer system according to the embodiment. The computer system in this example includes information processing apparatus 3000, 3100 and 3200.

The information processing apparatus 3000 is constituted by a CPU 3002, a main storage 3001, a communication control unit 3003, an I/O control unit 3004 and a terminal 3006. An application program 3008 is put on the main storage 3001, and operated by use of the CPU 3002. When the application program 3008 puts a user query 50 to the process request receiving server (FES) 10 of the database management system 2, a query request is sent to the process request receiving server (FES) 10 via a network 3007 by the communication control unit 3003 of the information processing apparatus 3000 and a communication control unit 3003 of the information processing apparatus 3100.

The information processing apparatus 3100 is constituted by a CPU 3002, a main storage 3001, the communication control unit 3003, an I/O control unit 3004, an external storage 3005 such as a magnetic disk unit, and a terminal 3006. The database management system 2 having the process request receiving server (FES) 10 as described with reference to FIG. 2 is put on the main storage 3001 of the information processing apparatus 3100, and operated by use of the CPU 3002. The database 3 managed by the database management system 2 is stored in the external storage 3005. A program 3300 for implementing the database management system 2 is also stored in the external storage 3005. The process request receiving server (FES) 10 reads/writes data from/into the external storage 3005 through the I/O control unit 3004, and uses the communication control unit 3003 to transmit/receive data to/from other information processing apparatus connected to the network 3007.

The information processing apparatus 3200 is constituted by a CPU 3002, a main storage 3001, a communication control unit 3003, an I/O control unit 3004, an external storage 3005 such as a magnetic disk unit, and a terminal 3006. The database management system 2 having the DB access server (BES) 20 as described with reference to FIG. 2 is put on the main storage 3001 of the information processing apparatus 3200, and operated by use of the CPU 3002. The database 3 managed by the database management system 2 is stored in the external storage 3005. A program 3300 for implementing the database management system 2 is also stored in the external storage 3005. The DB access server (BES) 20 reads/writes data from/into the external storage 3005 through the I/O control unit 3004, and uses the communication control unit 3003 to transmit/receive data to/from other information processing apparatus connected to the network 3007.

FIG. 4 is a diagram showing an example of the DB process service application AP table 400 according to the embodiment. As shown in FIG. 4, entries 401-403 of the DB process service application AP table 400 include titles of APs declared to control processing while recognizing DB process services as suspended ("Unavailable") when there occurs a failure in the corresponding BESs.

For example, as an example in FIG. 1, the AP "MSTUP" is registered in the entry 401. The AP title is registered in this table entry by a user such as a DB manager using a means provided by the DBMS in advance before the AP is activated. Alternatively, the AP may be registered dynamically as soon as the AP puts a query to the DBMS for the first time.

FIG. 5 is a diagram showing an example of the DB process service status table 500 according to the embodiment. As shown in FIG. 5, entries 501-504 of the DB process service status table 500 include information indicating whether the corresponding BESs are providing DB process services or under suspension. In this example, the status where each BSE is providing service is expressed by "Available", and the state where the BSE is under suspension is expressed by "Unavailable".

The concept that the DB process service is being provided/suspended is independent of whether the corresponding BES is prevented from performing the DB process due to a machine failure or not. Specifically, in the example of FIG. 5, the BES 1 (501) and the BES 2 (502) are suspended (Unavailable), and the BES 3 (503) and the BES 4 (504) are providing (Available). In the example of FIG. 1, only the BES 1 is really prevented from performing a DB process due to occurrence of a machine failure, but the BES 2 can perform a DB process. Only the AP registered in the DB process service application table in FIG. 4 recognizes the suspended BES 1 and BES 2 as suspended. That is, a query from the AP "MSTUP" is processed in the DBMS regarding the services of the BES 1 and the BES 2 as suspended. The process control will be described later with reference to FIG. 7.

FIG. 6 is a table showing an example of the DB process service related table 600 according to the embodiment. As shown in FIG. 6, each entry of the DB process service related table 600 includes a title of a BES to be suspended in connection to a BES whose DB process service is suspended due to a server machine failure or the like. For example, the entry 601 indicates that when the BES 1 is suspended, the BES 2 should be also suspended in connection thereto. The entries 604 and 605 indicate that when the BES 4 is suspended, the DB process services of the two BESs 2 and 3 should be suspended.

The entries are registered in this table by a user such as a DB manager first when the data base system is built up.

Figure 7:
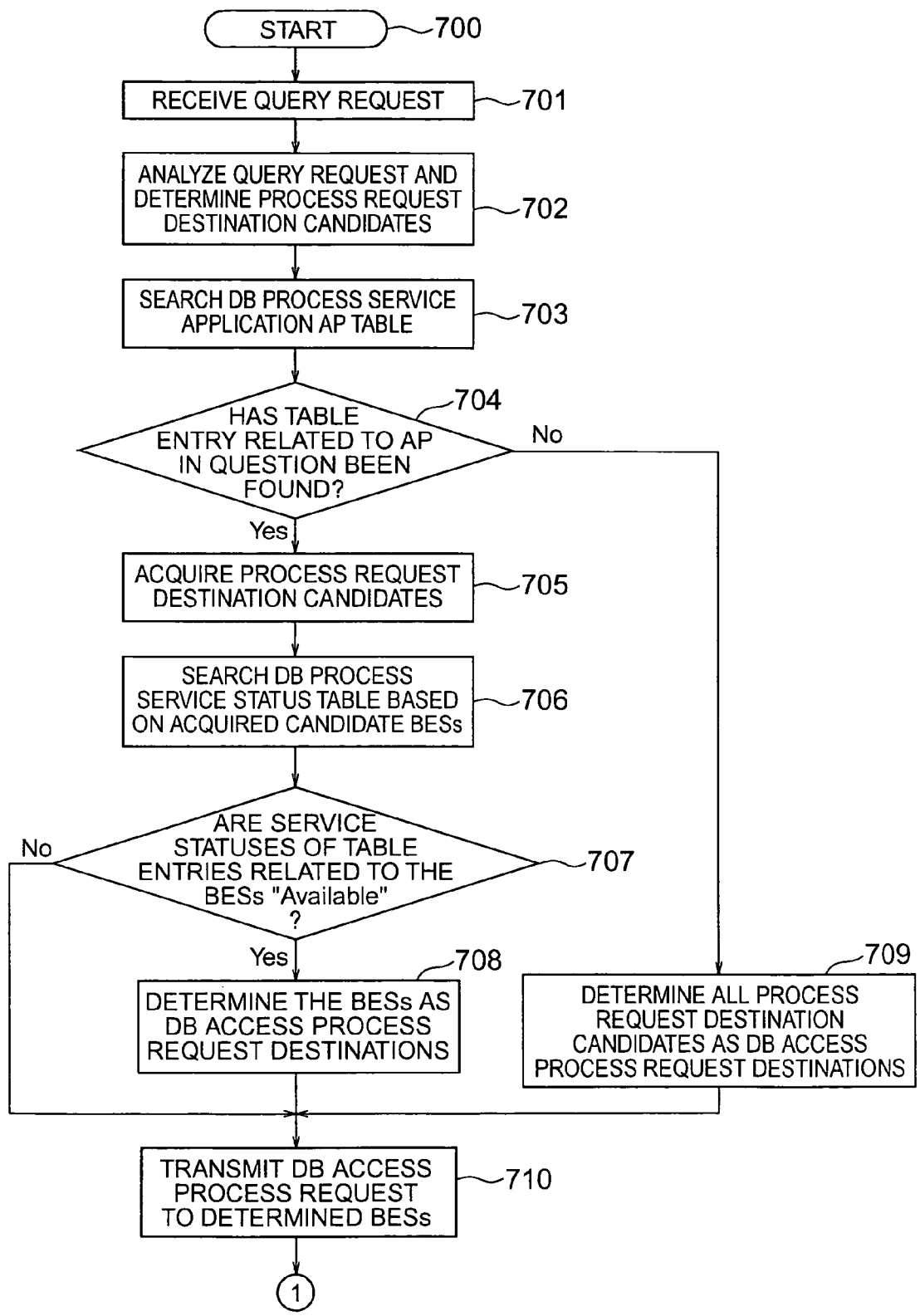
FIG. 7 is a flow chart showing the procedure of a process request control portion 211.

FIG. 7 is a flow chart showing the procedure of the process request control portion 211 according to the embodiment. As shown in FIG. 7, in the process request control portion 211 of the process request receiving server (FES) 10, first the user query 50 from the UAP 6 is received by the communication control unit 3003 (Step 701).

Next, the received query request is analyzed to determine process request destination candidates (Step 702). The process request destination candidates are typically determined with reference to dictionary information managed by the DBMS. The DB process service application AP table 400 indicating the AP to be processed and controlled in accordance with the service available status of the DB access server (BES) 20 is searched (Step 703). It is determined whether table entry related to the AP have been found or not (Step 704). When the table entry is not found, the routine of processing proceeds to Step 709, in which all the process request destination candidates are acquired and determined as DB access request destinations. On the other hand, when the table entry related to the UAP 6 is found, the routine of processing proceeds to Step 705, in which process request destination candidates are acquired and stored in a memory.

Next, the DB process service status table 500 is searched with the acquired titles of the candidate BESs as a key (Step 706), and it is determined whether the service statuses of the table entries related to the BESs are "Available" or not (Step 707). When the service statuses are "Available", the routine of processing proceeds to Step 708, in which the BESs are determined as DB access request destinations, and a DB access request is transmitted to the determined BESs (Step 710). When the service statuses are not "Available", that is, "Unavailable" in Step 707, the BESs are not determined as DB access request destinations, but a DB access request is transmitted to other BESs that have been determined as DB access request destinations till then (Step 710).

In the data processing control portion 221 receiving the DB access request from the FES, access to data on the database 3 or the like is controlled in accordance with the received DB access request, and the DB access results are transmitted to the FES.

Figure 8:
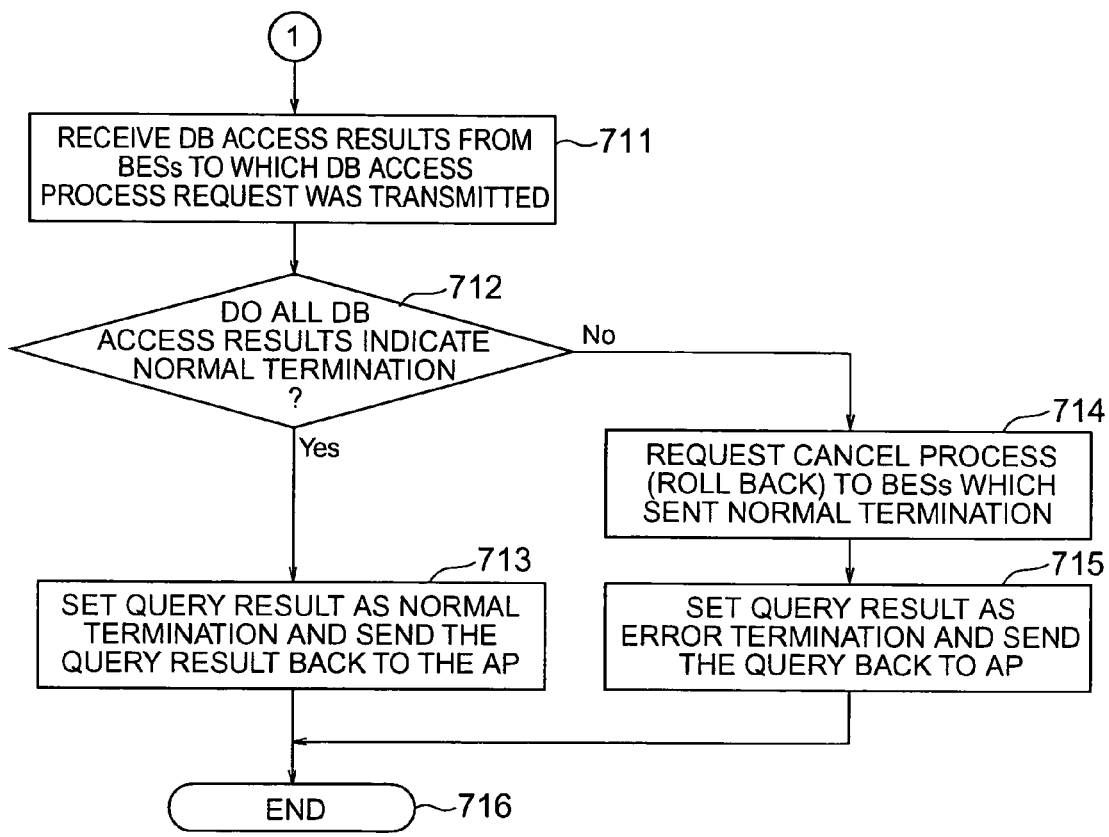
FIG. 8 is a flow chart showing a subsequent process of the process request control portion 211.

FIG. 8 is a flow chart showing subsequent steps of the processing of the process request control portion 211 according to the embodiment. After that, in Step 711, the DB access results transmitted from the BESs are received, and it is determined whether all the DB access results are terminated normally or not (Step 712). When all the DB access results are terminated normally, the query result is set as normally terminated, and sent back to the AP (Step 713). When error termination is included in one of the DB access results, the routine of processing proceeds to Step 714, in which a cancel process (roll back) is requested to the BESs having made a reply of the normal termination. After that, the query result is regarded as error termination and sent back to the AP (Step 715).

Figure 9:
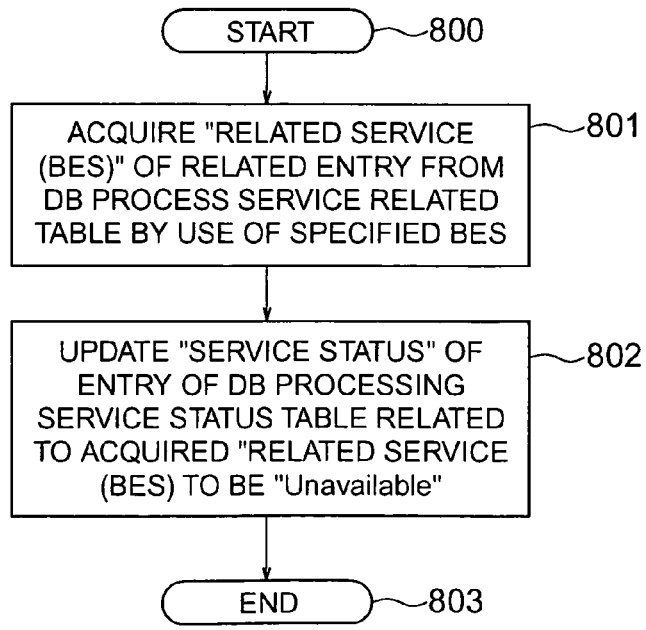
FIG. 9 is a flow chart showing the procedure of a countermeasure against a BES failure.

FIG. 9 is a flow chart showing the procedure against a failure of a BSE according to the embodiment. Due to a hardware failure or the like in the server machine where a BSE is disposed and operated, the BES may be prevented from executing a DB process. In such a case, a utility provided by the DBMS is executed by the user or an operation management program placed out of the DBMS. Thus, this countermeasure is carried out.

Due to the countermeasure, the DB process service of the BES which cannot execute a DB process and the DB process services of BESs related thereto are changed to be suspended conceptually, and the DBMS controls execution of the AP registered in the DB process service application AP table 400 as shown in FIG. 4.

As for steps in this countermeasure, first, an entry of the DB process service related table 600 is specified using the BES title designated by the utility for implementing this countermeasure, and a "related service (BES)" included in the entry is acquired (Step 801). Next, an entry of the DB process service status table 500 related to the acquired "related service (BES)" is specified, and a "service status" of the entry is changed to "Unavailable" (Step 802).

In the example described previously with reference to FIG. 1, the BES 1 and the BES 2 are changed to suspend their DB process services by this countermeasure when there occurs a failure in the server machine where the BES 1 is disposed.

The processes of the flow charts shown in FIGS. 7 to 9 are executed as a program in the computer system shown in FIG. 3 by way of example. However, the program is not limited to one which is stored in an external storage which can be physically and directly connected to the computer system as in the example of FIG. 3. The program may be stored in a computer-readable/writable storage medium such as a hard disk unit, a flexible disk unit, or the like. Alternatively, the program may be stored in an external storage connected to another information processing apparatus than the information processing apparatus constituting the computer system in FIG. 3.

According to the database processing system according to the embodiment, as has been described above, a process request is given to a serviceable information processing apparatus determined as a process request destination. Accordingly, even when there occurs a failure in one information processing apparatus, the influence can be localized so that the influence on the system as a whole can be minimized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database processing method carried out by one or more computers at least partially constructed of hardware and arranged in a shared-nothing architecture, comprising:

first receiving, at a process request receiving server, a processing-request for processing at a plurality of divided databases, each of which are controlled in access by a corresponding database (DB) access server of a plurality of DB access servers, and determining the DB access servers as process request destination candidates;

first judging, at the process request receiving server, whether or not a title of an originator which has sent the processing request to the process request receiving server, has been registered as being in a suspension in service, by referring to pre-stored title information indicating titles declared to control processing while recognizing DB process services as unavailable when there occurs a failure in a corresponding DB access server;

in response to result of the first judging, determining all process request destination candidates as DB access process request destinations for a DB access process request if the title of originator has not been registered, or acquiring fewer than all process request destination candidates if the title of originator has been registered;

second judging, for each process request destination candidate of the fewer than all process request destination candidates, whether or not the DB access server is available as a DB access process request destination by referring to pre-stored availability information indicating whether corresponding DB access servers are providing DB process services or under suspension;

accessing pre-stored relation information indicating one or more related DB access server whose service is to be suspended in connection with a related DB access server being under suspension, and designating the one or more related DB access server as being under suspension, within the pre-stored availability information;

determining, using the second judging, available DB access servers judged as available, as DB access process request destinations for the DB access process request;

transmitting a DB access request to each of the DB access process request destinations determined as available;

processing the DB access request at each DB access process request destination via the DB access server, and transmitting a result of the processing to the process request receiving server;

second receiving the result of the processing, at the process request receiving server, and judging whether or not the result for each of DB access servers are terminated normally; and returning, at the process request receiving server, a processing result to the originator of the processing request if the result for each of DB access servers is terminated normally, or requiring cancellation to any DB access server which terminated normally, if an error is included in the result of any DB access server.

2. The database processing method according to claim 1, wherein, it is judged that the result are terminated normally when each of all the process request receiving server returns a result showing a normal termination of processing.

3. The database processing method according to claim 1, wherein the database processing method is implemented within a database system based on a shared-nothing architecture.

4. A database processing system including one or more computers at least partially constructed of hardware and arranged in a shared-nothing architecture, comprising:
   a first server having a first controller,
   a plurality of second servers each of which having a second controller, and a plurality of storage devices which each store a divided database (DB);
   wherein the first controller including:
      means for receiving a processing request from an originator, the processing request for processing at a plurality of the divided databases;
      means for determining process request destination candidates;
      judgment means for first judging whether or not a title of the originator for data processing for which the processing request is to be performed, has been registered as being in a suspension in service, by referring to pre-stored title information indicating titles declared to control processing while recognizing DB process services as unavailable when there occurs a failure in a corresponding DB access server;
      in response to result of the first judging, means for determining all process request destination candidates as DB access process request destinations for a DB access process request if the title has not been registered as being in the suspension in service, or means for acquiring fewer than all process request destination candidates if the title has been registered as being in the suspension in service;
      means for second judging, for each process request destination candidate of the fewer than all process request destination candidates, whether or not the second server is available as a DB access process request destination by referring to pre-stored availability information indicating whether corresponding DB access servers are providing DB process services or under suspension;
      a relating unit accessing pre-stored relation information indicating one or more related DB access server whose service is to be suspended in connection with a related DB access server being under suspension, and designating the one or more related DB access server as being under suspension, within the pre-stored availability information;
      means for determining available DB access servers judged as available by the means for second judging, as DB access process request destinations for the DB access process request;
      means for transmitting a DB access request to each of the DB access process request destinations determined available in response to result of the second judging;
   wherein each second controller including:
      means for processing the DB access request, and means for transmitting a result of the processing to the first controller;
   wherein the first controller further including:
      means for second receiving the result of the processing, means for judging whether or not the result of the processing for each of the second server are terminated normally,
      means for returning a processing result for each of the second server terminated normally, and
      means for requiring cancellation to any of the second server which terminated normally, if an error is included in the result of any of the second server.

5. The database processing system according to claim 4, wherein, it is judged that the result are terminated normally when each of all the first controller returns a result showing a normal termination of processing.

6. The database processing system according to claim 4, wherein the database processing system is implemented based on a shared-nothing architecture.

7. A database processing method carried out by one or more computers at least partially constructed of hardware and arranged in a shared-nothing architecture, comprising:
   first receiving, at a process request receiving server, a processing request for processing at a plurality of divided databases, each of which are controlled in access by a corresponding database (DB) access server of a plurality of DB access servers, and determining the DB access servers as process request destination candidates;
   first judging, at the process request receiving server, whether or not an application program title of an originator which has sent the processing request to the process request receiving server, has been registered as being in a suspension in service, by referring to pre-stored title information indicating application program titles declared to control processing while recognizing DB process services as unavailable where there occurs a failure in a corresponding DB access server;

in response to result of the first judging indicating that the application program title has not been registered, determining all process request destination candidates as DB access process request destinations for a DB access process request;

in response to result of the first judging indicating that the application program title has been registered, second judging whether or not each DB access server is available as a DB access process request destination by referring to pre-stored availability information indicating whether corresponding DB access servers are providing DB process services or under suspension;

accessing pre-stored relation information indicating one or more related DB access server whose service is to be suspended in connection with a related DB access server being under suspension, and designating the one or more related DB access server as being under suspension, within the pre-stored availability information;

determining, using the second judging, available DB access servers judged as available, as DB access process request destinations for the DB access process request;

transmitting a DB access request to each of the DB access process request destinations determined as available;

processing the DB access request at each DB access process request destination via the DB access server, and transmitting a result of the processing to the process request receiving server;

second receiving the result of the processing, at the process request receiving server, and judging whether or not the result for each of DB access servers are terminated normally; and returning, at the process request receiving server, a processing result to the originator of the processing request if the result for each of DB access servers is terminated normally, or requiring cancellation to any DB access server which terminated normally, if an error is included in the result of any DB access server.

\* \* \* \* \*